United States Patent [19]

Vasishth et al.

[11] 4,086,125

[45] Apr. 25, 1978

[54] WOOD LAMINATION METHOD UTILIZING EMULSIFIED PHENOL-FORMALDEHYDE RESINS

[75] Inventors: Ramesh C. Vasishth, Delta; Pitchaiya Chandramouli, Richmond, both of Canada

[73] Assignee: Cor Tech Research Ltd., Richmond, Canada

[21] Appl. No.: 754,616

[22] Filed: Dec. 27, 1976

Related U.S. Application Data

[62] Division of Ser. No. 567,881, Apr. 14, 1975, Pat. No. 4,017,437.

[30] Foreign Application Priority Data

Apr. 17, 1974 United Kingdom ............... 16860/74

[51] Int. Cl.$^2$ .............................................. B29J 5/00
[52] U.S. Cl. ................................... 156/62.2; 156/335; 264/123; 428/326; 428/529
[58] Field of Search ............... 156/62.2, 335; 428/326, 428/529, 528; 264/109, 125, 123, 126; 260/29.3, 34.2, 57 A, 57 C, 59 R; 427/212

[56] References Cited

U.S. PATENT DOCUMENTS

| | | | |
|---|---|---|---|
| 1,976,433 | 10/1934 | Cheetham | 260/29.3 |
| 2,185,447 | 1/1940 | Thompson et al. | 156/335 |
| 2,937,159 | 5/1960 | McKay et al. | 260/59 R |
| 3,267,053 | 8/1966 | Nagle et al. | 156/335 |
| 3,422,068 | 1/1969 | Kreibich et al. | 260/14 |

FOREIGN PATENT DOCUMENTS 927,041 5/1973 Canada.

*Primary Examiner*—David Klein
*Assistant Examiner*—J. J. Gallagher
*Attorney, Agent, or Firm*—Sim & McBurney

[57] ABSTRACT

A rapidly curable phenol-formaldehyde resin is provided in the form of an emulsion which has particular utility in panel board production, particularly waferboard production.

10 Claims, No Drawings

WOOD LAMINATION METHOD UTILIZING EMULSIFIED PHENOL-FORMALDEHYDE RESINS

This is a division of application Ser. No. 567,881 filed Apr. 14, 1975, now U.S. Pat. No. 4,017,437.

FIELD OF INVENTION

The present invention relates to aqueous emulsions of thermosetting phenol-formaldehyde resins and their uses in panel board production.

BACKGROUND TO THE INVENTION

Resins used in certain adhesive applications where small quantities of resin, typically less than 10 percent by weight of the elements, are spread evenly over a large surface area, first are emulsified to provide a ready means of spray-applying the small quantity of resin evenly.

Typical applications of such emulsions are in panel board production, such as waferboard, particle board and plywood production. In waferboard production, about 2 to about 3% by weight of resin typically is applied whereas in particle board production about 6 to about 9% of resin is applied. In plywood production, depending on the application techniques used, the resin emulsions may be further modified by adding fillers and thickeners, such as wheat flour, sawdust, clay and oil.

Thermosetting phenol-formaldehyde resins that contain benzylic ether linkages ortho to the phenolic hydroxyl group are described in Canadian Patent No. 927,041, U.S. Pat. No. 3,485,797 and in our copending application Ser. No. 567,865 filed Apr. 15, 1975.

The latter resins, although generally similar in gross chemical structure, nevertheless are different from each other in many respects. Some of these differences may be detected by comparing the infra-red spectra of the resins and others by comparing their nuclear magnetic resonance spectra. Other differences are demonstrated by their performance characteristics in specific applications.

Resins produced by reacting formaldehyde with phenol in an aqueous reaction medium in the presence of a water-soluble metal carboxylate catalyst therefor, either according to the procedure of Canadian Patent No. 927,041 or according to our copending application Ser. No. 567,865 mentioned above, can be emulsified in water, under appropriate conditions, to give stable dispersions. On the other hand, resins produced by reacting formaldehyde with phenol under anhydrous conditions in accordance with U.S. Pat. No. 3,485,797 do not yield stable emulsions under these conditions.

It has been found that the emulsification characteristics of the resins are dependent on the relative concentrations of phenol and formaldehyde used to form the resin. Thus, resins made with a mole ratio of formaldehyde to phenol of 1.6:1 or less provide stable emulsions at viscosities in excess of 50,000 cps at ambient temperatures of around 24° C and in excess of 9,000 cps at 50° C, while resins formed with formaldehyde to phenol mole ratios in excess of 1.7:1 give stable emulsions even at viscosities as low as 1,000 centipoise at ambient temperatures of about 24° C. (350 centipoise at 50° C).

However, resins made with mole ratios of formaldehyde to phenol less than 1.5:1 do not yield stable emulsions even at very high consistencies corresponding to such high viscosities as 12,000 cps at 50° C.

In the examples of Canadian Patent No. 927,041, it is indicated that for plywood production using an emulsified form of the resin, press times may be decreased by addition to the emulsion of a strong acid, such as para-toluene sulfonic acid. The resin is produced at a mole ratio of formaldehyde to phenol of 1.5:1, which would require the resin to be prepared at high viscosities, in excess of 50,000 centipoise at 24° C, to be emulsifiable. The high viscosity resin must be warmed to around 70° C for emulsification to be carried out.

If the acid catalyst for curing the resin is added to the high viscosity resins prior to emulsification, then, upon heating to the temperature required for emulsification of the resins, cross-linking would tend to occur, increasing further the viscosity or leading to gellation.

Addition of acid to the emulsion of the high viscosity resins leads to the bulk of the acid remaining in the aqueous phase, hence increasing the quantity of acid required for catalysts of the resin, possibly to levels of physical impairment of the elements to which the emulsion is applied.

SUMMARY OF INVENTION

It has now been surprisingly found that the low viscosity resins produced at mole ratios of formaldehyde to phenol greater than about 1.7:1 may be emulsified at or near ambient temperatures and that acid addition of the resin may be carried out prior to emulsification.

In accordance with the present invention, therefore, there is a provided a resin-in-water emulsion formed from a room temperature-stable, acid-catalyzed and mobile thermosetting phenol-formaldehyde resin capable of rapid cure at elevated temperature, formed by reacting formaldehyde with phenol at a mole ratio of formaldehyde to phenol greater than about 1.7:1 in an aqueous reaction medium, typically containing a metal carboxylate catalyst therefor followed by acid addition using at least one strong acid, and having, prior to acid addition, a viscosity of about 1,000 to about 40,000 cps at about 24° C.

GENERAL DESCRIPTION OF THE INVENTION

The resin prior to acid addition preferably is formed by the procedure of the copending application Ser. No. 567,865 mentioned above, in which the formaldehyde to phenol are reacted together in a single step wholly at a temperature of above about 90° C.

Acid may be added to the thermosetting phenol-formaldehyde resin in varying amounts, depending on the acid used. Typically, the acid is added in catalyzing amounts, preferably from about 0.5 to about 5% by weight of para-toluene sulfonic acid. As set forth in more detail in our copending application Ser. No. 567,864 filed concurrently herewith, addition of acid to the resin causes a change in chemical structure and results in a new resin having a fast cure rate. The quantity of acid added may exceed that required to achieve the change in resin structure to provide free acid for catalysis of the resin curing step. The addition of acid, irrespective of the quantity, is referred to herein as "acid-catalysis".

The ability to catalyse the resin prior to emulsification leads to many advantages.

For example, when emulsions are formed in one case, from a precatalyzed resin and, in another case, by addition of acid to an emulsion of the resin, the former case shows faster cure rates. Further, for the same rate of cure, it has been found that precatalyzed emulsified resins require only about one-sixth the amount of catalyst as compared to the emulsified resin to which the catalyst is added after emulsification.

The latter observations arise since, in the case of the precatalyzed resins, the bulk of the acid remains in the resin phase after emulsification, whereas, as mentioned above, when the acid catalyst is added to the resin emulsions, the bulk of the acid remains in the aqueous phase.

Additionally, it has been surprisingly found that resin emulsions made from pre-catalyzed resins have extensive shelf-lives and exhibit only a minimal degree of stratification, typically greater than about 6 weeks. In contrast, emulsions made from resins without acid addition or to which acid is post added tend to stratify and have to be stirred prior to use, posing obvious problems in industrial applications where large volumes of material have to be handled.

The emulsions of this invention may be used in a variety of adhesive applications, typically in panel board production, including waferboard and particle board production and plywood production. The emulsions may be spray applied in conventional manner to substrate members producing the panel board.

EXAMPLES

EXAMPLE 1

This example illustrates the production of resins.

Into a glass reaction vessel equipped with an agitator, a reflux condenser and a thermometer was charged 1794.1g (19.09 moles) of phenol, 2788.3g (34–35 moles) of formaldehyde having a methanol content of less than 1.5 wt.% (corresponding to a formaldehyde to phenol mole ratio of 1.8:1), 144.8g (0.034 moles and about 8 wt.% based on phenol) of zinc acetate dihydrate and 772.8g of water, to provide a reaction mixture having a total reactants concentration of 54.01%.

The mixture was heated rapidly to about 90° C in about 35 to 45 minutes. The temperature of the mixture was further raised to reflux over the next 15 minutes by controlling the rate of heating. The reaction mixture was kept under constant reflux until the final viscosity of the resin phase reached the desired value.

After completion of the reflux period, the reaction mixture was cooled to 35° C and the agitation stopped. Cooling was continued without agitation until separation was completed and the reaction mixture had reached a temperature of about 25° C. The liquid resin phase was separated from the aqueous phase. The solids content of the finished resin was determined by drying at 105° C for 2 hours and was generally found to be within 75 to 80%.

Following the procedure, with suitable adjustments for mole ratio in two cases, three resins were formed:

a. a resin of final viscosity of 1000 cps at 24° C using a mole ratio of 1.5:1, b. a resin of final viscosity of 50,000 cps at 24° C using a mole ratio of 1.5:1 and c. a resin of final viscosity of 2400 cps at 24° C using a mole ratio of 1.8:1.

EXAMPLE 2

This example illustrates emulsion formation.

The resins a), b) and c) provided by the procedure of Example 1 were each divided into two parts. To one part was added 4% of a 50% aqueous solution of para-toluene sulfonic acid while the other parts were used as such.

A solution of Natrosol HXR 250 (hydroxy ethyl cellulose) 1% in water, was prepared and warmed to 35° C. To the warmed solution was added enough of the resins a), b) and c) under agitation to give a final resin concentration of 39 to 40%. A stable emulsion was obtained with resin c) only. In the case of resin a), the emulsion flocculated in five minutes, while resin b) was too viscous to disperse in the solution. When, however, both resin b) and the water were heated to 70° C, a stable emulsion was readily obtained. On keeping the emulsions for 24 hours, a distinct water phase was formed on the surface, but the emulsions again became homogeneous on stirring.

The emulsion formation procedure was repeated with the acid-catalyzed samples. Again the emulsion made with resin a) flocculated. Resin b) gelled on heating to 70° C but resin c) in this way was examined at intervals of 24 hours and was found to be homogeneous even after eight weeks.

These experiments clearly demonstrate that a resin made at a mole ratio of formaldehyde to phenol of 1.5:1 was not emulsifiable except at high viscosity and that at the higher viscosity emulsification has to be carried out at high temperatures. At these higher temperatures, the resins tend to gel, however, if precatalyzed with acid, rendering emulsification impractical after acid addition.

In contrast, when a resin formed from a mole ratio of formaldehyde to phenol of 1.8: was used, emulsification at low viscosities was achieved and stable emulsions could be made with or without the prior addition of the acid catalyst.

EXAMPLE 3

This example shows the use of acid-catalyzed emulsions in waferboard production.

A 1.8:1 mole ratio phenol-formaldehyde resin (about 75% N.V. solids) cooked in accordance with the procedure of Example 1 was emulsified as described in Example 2 by dispersion in a 1% aqueous solution of Natrosol HXR 250 (hydroxy ethyl cellulose) to give a stable emulsion of about 39 to 43% N.V. solids.

Samples of the emulsion were catalyzed with various amounts of para-toluene sulfonic acid (as a 50% aqueous solution) and sprayed onto Aspen wafers of 4 and 6% moisture content at a resin level of 2.5% based on ultimate board weight.

In comparative tests, the resin first was catalyzed with 2% para-toluene sulfonic acid (used as a 50% aqueous solution) and was emulsified in analogous manner to that described above at least 3 hours after catalyst addition.

The resin coated wafers in each case were laid into a mat and hot pressed at 210° C to a thickness of 5/16 inch at a density of 40 lb/cu.ft. for the required cycle time, cooled and tested.

The results are reproduced in the following Table I:

TABLE I

| Moisture Content % | Press Cycle (mins.) | Catalyst Level % Resin | Post (Po) or Pre (Pr) Catalysis | Internal Bond[1] Strength (psi) |
|---|---|---|---|---|
| 6 | 3.5 | 5 | Po | Delaminated |
| 6 | 5 | 5 | Po | Delaminated |
| 6 | 3.5 | 8 | Po | Delaminated[2] |
| 6 | 3.5 | 12 | Po | 31[2] |
| 6 | 3.5 | 20 | Po | 30[2] |
| 4 | 3.5 | 5 | Po | 55 |
| 6 | 3.5 | 2 | Pr | 62[3] |

TABLE I-continued

| Moisture Content % | Press Cycle (mins.) | Catalyst Level % Resin | Post (Po) or Pre (Pr) Catalysis | Internal Bond[1] Strength (psi) |
|---|---|---|---|---|
| 6 | 3 | 2 | Pr | 55[3] |

Notes:
[1] An internal bond strength exceeding 50 psi is considered good.
[2] Darkened spots were evident over the board surface.
[3] Boards very light in color.

The results of the above Table I show that the emulsions that are made from resins to which acid is added prior to emulsification act as faster curing adhesives, require considerably less acid and yield a better looking product.

SUMMARY

The present invention, therefore, provide a stable resin-in-water emulsion having particular and enhanced utility in panel board production. Modifications are possible within the scope of the invention.

What we claim is:

1. A method of forming a panel board, which comprises:
    reacting formaldehyde and phenol at a mole ratio of formaldehyde to phenol greater than about 1.7:1 in an aqueous reaction medium in the presence of a metal carboxylate catalyst therefor to form a resin having a viscosity of about 1,000 to 40,000 cps at about 24° C,
    adding to said resin at least one strong acid in a catalyzing amount for thermosetting said resin at elevated temperature to form a room temperature-stable acid-catalyzed and mobile thermosetting phenol-formaldehyde resin capable of rapid cure at elevated temperature,
    emulsifying the latter resin to form a stable resin-in-water emulsion by dispersing the latter resin in water at a temperature below the curing temperature of the latter resin,
    applying said emulsion to a plurality of panel board-forming elements to provide a substantially even distribution of resin over part of the surfaces of said elements,
    assembling the coated elements,
    heating said resin to above its curing temperature while maintaining said coated elements in said assembled condition to adhesively join said elements together by thermoset resins, and
    recovering a panel board.

2. The method of claim 1, wherein said metal carboxylate catalyst is zinc acetate.

3. The method of claim 1, wherein said reaction is carried out wholly at a temperature of above about 90° C.

4. The method of claim 1, wherein said acid is para-toluene sulfonic acid.

5. The method of claim 4 wherein said acid is added in an amount of from 0.5 to 5% by weight.

6. The method of claim 1 wherein said panel board-forming elements are wood wafers, whereby said panel board is a waferboard.

7. The method of claim 6, wherein said emulsion is applied to the wood wafers by spraying and about 2 to about 3% by weight of resin is applied to the wood wafers.

8. The method of claim 1 wherein said panel board-forming elements are wood particles, whereby said panel board is particle board.

9. The method of claim 8 wherein said emulsion is applied to the wood particles by spraying and about 6 to about 9% by weight of resin is applied to the wood particles.

10. The method of claim 1 wherein said panel board-forming elements are wood lamina of large dimensions, whereby said panel board is plywood.

* * * * *